(12) United States Patent
Williams et al.

(10) Patent No.: US 8,473,481 B2
(45) Date of Patent: Jun. 25, 2013

(54) OBJECT RECOGNITION AND LIBRARY

(75) Inventors: Oliver M. C. Williams, San Francisco, CA (US); Michael A. Isard, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 605 days.

(21) Appl. No.: 12/404,358

(22) Filed: Mar. 16, 2009

(65) Prior Publication Data

US 2010/0235406 A1 Sep. 16, 2010

(51) Int. Cl.
*G06F 17/30* (2006.01)

(52) U.S. Cl.
USPC .......................................... 707/711

(58) Field of Classification Search
USPC .......................................... 707/711
See application file for complete search history.

(56) References Cited

U.S. PATENT DOCUMENTS

| | | | |
|---|---|---|---|
| 5,323,327 A | 6/1994 | Carmichael et al. | |
| 6,778,698 B1 | 8/2004 | Prakash et al. | |
| 6,895,104 B2 | 5/2005 | Wendt et al. | |
| 7,215,833 B1 | 5/2007 | Tepera et al. | |
| 7,290,707 B2 | 11/2007 | Sawasaki | |
| 8,077,252 B2* | 12/2011 | Fukugawa et al. | 348/354 |
| 2007/0174152 A1 | 7/2007 | Bjornberg et al. | |
| 2008/0065615 A1* | 3/2008 | Bober | 707/3 |

FOREIGN PATENT DOCUMENTS

WO 2008029254 A2 3/2008

OTHER PUBLICATIONS

Leonardi, et al., "Automatic Book Recognition", Retrieved at http://tev.fbk.eu/OCR/BookRecognition.html>>, Jan. 24, 2009, pp. 3.
Messelodi, et al., "Context Driven Text Segmentation and Recognition", Retrieved at <<http://tev.fbk.eu/people/modena/Papers/TextSegmentationTechRep.pdf>>, pp. 1-10.
"Digital Hoard", Retrieved at <<http://www.digitalhoard.com/>>, Jan. 24, 2009, pp. 3.
Fayyad, Usama M., "SKICAT: Sky Image Cataloging and Analysis Tool", Retrieved at http://www.infor.uva.es/~calonso/IAII/Aprendizaje/SKIcatIJCAI95.pdf>>, pp. 2067-2068.

* cited by examiner

*Primary Examiner* — Baoquoc N To
(74) *Attorney, Agent, or Firm* — Microsoft Corporation

(57) ABSTRACT

An image may be received, a portion of which corresponds to a surface of an object, such as a book, a CD, a DVD, a wine bottle, etc. The portion of the image that corresponds to the surface of the object is located. The portion of the image is compared with previously stored images of surfaces of objects to identify the object. A record of the object is created and added to a library. The record of the object may comprise the image of the object, the portion of the image which corresponds to the surface of the object, and/or the received image itself. The record may comprise an indicator of a location of the object.

20 Claims, 8 Drawing Sheets

Add Object(s) to Library

DUNE FRANK HERBERT

Title: Dune
Author: Frank Herbert
Paperback: 544 pages
Publisher: Ace; 25 Anv edition (9-1-1990)
Language: English
ISBN-10: 0441172717
Location: Upstairs Shelf ( Add to Library )

RUN RABBIT RUN

Title: Run Rabbit Run
Author: John Updike
Paperback: 272 pages
Publisher: Ballantine Books (8-27-1996)
Language: English
ISBN-10: 0449911659
Location: Upstairs Shelf ( Add to Library )

The Handmaid's Tale
ATTWOOD

Title: The Handmaid's Tale
Author: Margaret Atwood
Hardcover: 392 pages
Publisher: Everyman's Library (10-17-2006)
Language: English
ISBN-10: 0307264602
Location: Upstairs Shelf
235
237

( Add to Library )

( Add All to Library )

Object(s) Added to Library

The following books were added to your Library at the Upstairs Shelf: 242
    Dune by Frank Herbert
    Run Rabbit Run by John Updike
    The Handmaid's Tale by Margaret Atwood Users with a similar library to your library also have: 245

Matter by Ian M. Banks ( Purchase Book ) 247

Rabbit Redux by John Updike ( Purchase Book )

OBJECT RECOGNITION AND LIBRARY

BACKGROUND

Many people collect objects such as books, compact disks (CDs), digital versatile disks (DVDs), wine, and a variety of other objects. Keeping track of the objects in a library or collection can be a difficult and time consuming task. One solution is manually keeping a list of the objects in a collection. For example, a user may add an entry to a list of objects when an object is acquired. This solution is flawed in that it requires the user to manually enter a record of an object into the list when an object is acquired. A user may forget to enter a record of an object, enter the data pertaining to the object incorrectly, or may otherwise lose the list. Another flaw with this technique is that it may not help the user locate a particular object when the object has been moved or removed from its usual storage place.

Another solution is the Delicious Library™ media cataloguing software application, developed by Delicious Monster, Seattle, Wash. The software allows users to manage their collections of books, movies, CDs, etc. by entering data pertaining to them manually or by using a barcode scanner. A user scans a barcode on an object. The object is identified by the barcode and a record entry for the object is made in a database.

This solution makes entry of objects into a library easier and less error prone than the manual solution described above, but has drawbacks. For example, the Delicious Library™ solution requires that the user scan each object using specialized equipment such as barcode scanner. In addition, the user has to scan existing objects in a collection in order to add them to the library. This may be problematic and time consuming for users with preexisting collections. Moreover, the information provided by the barcode scan may not provide the user with information to locate the object in their collection. For example, a user may have a large collection of books spanning multiple bookshelves on multiple floors of the user's house. The user may know that they have a particular book because of the record entry in the database. However, the entry may not indicate the book's location, making retrieval of the book difficult and time consuming for the user.

SUMMARY

An image may be received, a portion of which corresponds to a surface of an object, such as a book, a CD, a DVD, a wine bottle, etc. The portion of the image that corresponds to the surface of the object is located. The portion of the image is compared with previously stored images of surfaces of objects to identify the object. A record of the object is created and added to a library.

In an implementation, the record of the object may comprise the image of the object, the portion of the image which corresponds to the surface of the object, and/or the received image itself. The record may comprise an indicator of a location of the object.

In an implementation, the object may be identified by comparing the portion of the image which corresponds to a surface of an object with one or more of the previously stored images of surfaces of objects, generating a confidence value for each of the images of surfaces of objects compared to the portion of the image, and identifying the image of a surface of an object with the highest confidence value as matching the located portion of the image.

In an implementation, each of the stored images of surfaces of objects may have associated characteristics. Text may be identified in the portion of the image which corresponds to a surface of an object. Only stored images having associated characteristics that match the identified text may be compared with the portion of the image. In an implementation, the objects may be books, and the identified text may include an author of the book, a publisher of the book, and/or a title of the book. The surfaces of the objects may be book spines or book covers. The library may be transmitted to a social networking system.

In an implementation, an external library that has one or more records in common with the library may be identified. One or more objects from the external library that correspond to records that are not in common with the library may be identified and provided as a recommendation. An offer may be presented to purchase one or more of the recommended objects.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings:

FIGS. 2a-2d are illustrations of example user interfaces for use with a system for the creation and maintenance of an object library;

DETAILED DESCRIPTION

Figure 1:
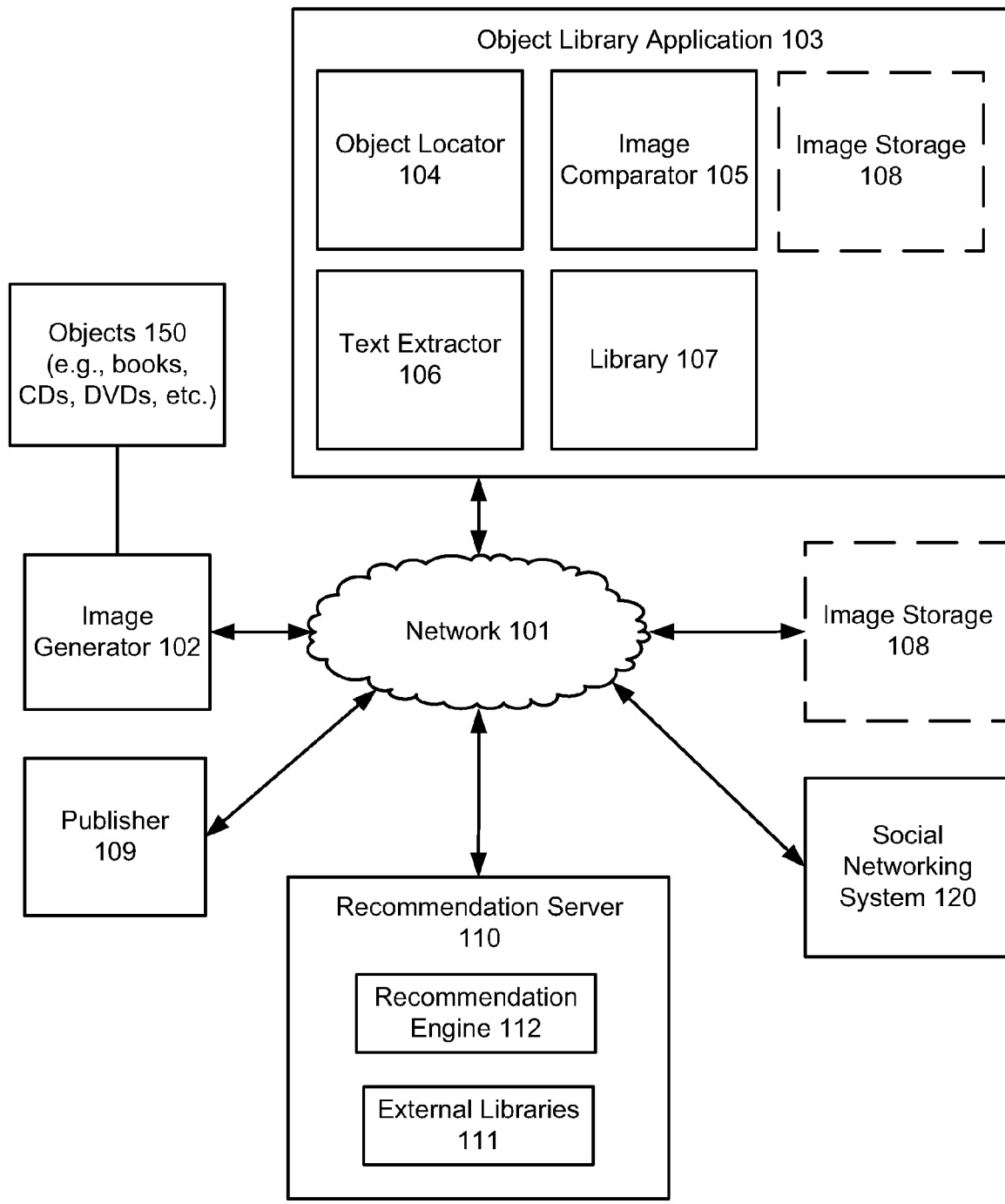
FIG. 1 is a block diagram of an implementation of a system for the creation and maintenance of an object library.

FIG. 1 is a block diagram of an implementation of a system 100 for the creation and maintenance of an object library. The system 100 may include an image generator 102 in communication with an object library application 103 through a network 101. The network 101 may include a variety of network types, such as a local area network, wide area network, public-switched telephone network, packet-switched network (e.g., the Internet), cellular telephone network, etc.

The image generator 102 may include a variety of devices capable of taking digital images or videos, such as a digital camera, web cam, camera phone (e.g., mobile phone, cellular phone, or smart phone with a camera), personal digital assistant (PDA), camcorder, handheld computing device, personal computer (PC), etc. The image generator 102 may further transmit the digital image or video to the object library application 103 through the network 101. In some implementations, the image generator 102 may provide the digital image to the object library application 103 through a computer-readable storage medium (e.g., compact disk, secure media card, USB drive, etc.) or through a connection such as a USB cable or a Firewire cable.

The object library application 103 may receive images or videos of objects 150 from the image generator 102. The images or videos may be of one or more objects 150 that a user wants to add to a library 107 of the object library application 103. For example, a user may take an image of a plurality of books on a bedroom bookshelf. The objects in the image or video may be objects that the user wishes to add to the library 107 or objects whose location the user wants to update in the library 107.

In some implementations, the library 107 may be a database with a record entry for each object of the user. For example, the library 107 may include a record of each book that a user owns. Other object types may also be included in the library such as CDs, DVDs, records, cassette tapes, video games, liquor and wine bottles, etc. Records in the library 107 may include a variety of characteristics about the object it represents. For example, if the object is a book, the record may include a title, author, publisher, ISBN number, page count, edition, etc. Where the object is a bottle of wine, the record may include a variety, vintage, country of origin, vineyard, etc. Any number of object characteristics may be included in a record.

The object library application 103 may receive images or videos of one or more objects 150 from the image generator 102, determine the object(s) depicted in the image or video, and add records of the object(s) to the library 107. In some implementations, the object library application 103 may include in the record an indicator of the location of the object. A later user who wishes to locate a particular object may then query the library 107 for the record of the object. The user may then retrieve the object from the location indicated in the record.

In some implementations, a user may be prompted to provide the location of the object when the image or video is provided by the image generator 102. For example, the user may be prompted to provide a location by either the image generator 102 or the object library application 103. Continuing the example described above, the user may provide that the location is the "bedroom bookshelf."

In other implementations, the indicator of the location of the object is the image received from the image generator 102. The image may be stored in the library 107 with the record of the object. Continuing the example described above, the user may query the library 107 for a particular book. The located record corresponding to the book may include the image of the bedroom bookshelf. The user may recognize the bedroom bookshelf from the image and may then retrieve the book from the bedroom bookshelf.

Other indicators of location may also be used. For example, the image generator 102 may provide coordinates of the location of where the image or video was taken using a GPS (global positioning system) device or other location device.

The object library application 103 may include an object locator 104. The object locator 104 may locate one or more portions of a received image or video that correspond to a surface of an object. In some implementations, the object locator 104 may locate the portion of an image that corresponds to a surface of an object by analyzing the image using computer vision techniques. For example, where the objects are books, the object locator 104 may analyze the image to locate the portions of the image that correspond to book covers or book spines. Because typical objects in a library (e.g., books, CDs, DVDs, wine bottles, etc.) have relatively uniform geometries and dimensions, the object locator 104 may locate the portions of the image that correspond to surfaces of objects by determining object boundaries in the image and locating the portions of the image that are likely to correspond to surfaces of the object based on the size and shape of the object boundaries. Portion of the image with non-uniform dimensions and geometries may be ignored by the object locator 104. These non-uniform portions may correspond to plants, trophies, pets, or any other type of object or thing that may be stored or located proximate to the objects in the library, but may not themselves be part of the library of objects.

By locating the portion(s) of the image that correspond to surfaces of objects, a user is able to add objects to the library 107 without removing the objects from their typical storage space. As described above, a user may add records corresponding to a plurality of books to a library merely by taking an image of the books on a shelf. The object locator 104 may then locate the portions of the image that correspond to the spines or covers of the books on the shelf.

Where a video is provided by the image generator 102, the object locator 104 may first extract one or more images from the video and may then locate the portions of the image that correspond to surfaces of objects from the extracted one or more images. Any method or technique known in the art for extracting one or more images from a video may be used.

In some implementations, the object locator 104 may only locate portions of the image that correspond to surfaces of one or more particular types of objects. For example, a user may want to only catalog books. The object locator 104 may then only locate portions of the image that correspond to surfaces of books and may ignore portions of the image that do not correspond to surfaces of books (e.g., portions of the image that correspond to surfaces of CDs, DVDs, video games, etc.). The unwanted portions of the image may be determined based on the dimensions of the portions or based on visual cues found in the portions. For example, a portion of an image corresponding to a CD may have a CD logo or symbol visible in the portion. Computer vision techniques may be used to distinguish the unwanted portion of the images.

The object library application 103 may further include an image comparator 105. The image comparator 105 may identify an image of a surface of an object from a plurality of stored images of surfaces of objects that matches one or more of the portions in the received image located by the object locator 104. For example, where the portions located by the object locator 104 correspond to one or more book spines or covers, the image comparator 105 may identify images from a plurality of stored images of book spines and covers that match the book spines and covers shown in the portions. Any method or technique for comparing and/or matching images may be used.

In some implementations, the plurality of images may be located in an image storage 108. As illustrated, the image storage 108 may be located external to the object library application 103, or may be part of the object library application 103. In some implementations, the images in the image storage 108 may be provided by a publisher 109. For example, a publisher 109 of one or more objects (e.g., books, CDs, etc.) may provide images of various surfaces of the one or more objects to the image storage 108. In addition, the publisher 109 may further provide various details and characteristics of the objects along with the images. For example, where the objects are books, the characteristics may include a title, author, publisher name, ISBN number, edition, page count, etc. These characteristics may be stored with the images of the objects in the image storage 108.

The image comparator 105 may identify an image of a surface of an object from the plurality of images of surfaces of objects that matches one of the portions located by the object locator 104 by comparing the located portion of an image with one or more of the plurality of images of surfaces of objects. For example, the image comparator 105 may compare a located portion of an image with one or more of the images in the image storage 108. In some implementations, the image comparator 105 may first process the located portion to improve or standardize the located portion. For example, the image comparator 105 may adjust the contrast, sharpness, or color of the located portion. Other image processing techniques may be used.

The image comparator 105 may compare the located portion with an image from the image storage 108 and generate a confidence value based on the comparison. The confidence value may represent a probability that the located portion and the image represent the same surface of an object. The comparison of the located portion and the image may be done using any system, method, or technique known in the art for comparing images.

In some implementations, the image comparator 105 may first compare the located portions with images corresponding to objects that are already entered in the library 107. For example, a user may take an image of a plurality of books on a shelf. One or more of the books on the shelf may have been previously entered in the library, but may have been moved to a different location than when they were first entered. Thus, the image comparator 105 may potentially avoid the more computationally expensive operation of comparing one or more of the located portions with the images in the image storage 108, by first comparing the located portions with the images in the comparatively smaller library 107, for example.

After comparing a located portion with all or some of the images in the image storage 108, the image comparator 105 may select the image from the image storage 108 that matched the located portion with the highest confidence value as a matching image. In some implementations, where multiple images are found to match the portion with the same or statistically similar confidence value, the image comparator 105 may prompt a user to select the matching image from the images with the highest confidence values.

The object library application 103 may further include a text extractor 106. The text extractor 106 may extract text or other symbols from the located portions. For example, the text extractor 106 may use optical character recognition, or other techniques, to extract text from the located portions. Where the objects are books, the extracted text may describe the author, title, and/or publisher of the book, for example.

In some implementations, the image comparator 105 may use the extracted text in the comparison of the located portion with the images in the image storage 108. As described above, the images may have associated characteristics. The characteristics may have been provided by the publisher 109 and may identify a title, author, publisher, and/or other details regarding the object that an image represents. The image comparator 105 may then reduce the set of images from the image storage 108 that are compared with the located portion by limiting the comparison to images that have one or more characteristics that match some or all of the text extracted from the located portion. For example, where the located portion is of a book spine and the text extractor 106 extracts the word "Shakespeare" from the located portion, the image comparator 105 may only compare the located portion with images that have characteristics that include "Shakespeare." If no images having characteristics including "Shakespeare" are matched with the located portion with a confidence level greater than a threshold level, then the image comparator 105 may expand the comparison to include images that do not have characteristics that include "Shakespeare."

The image comparator 105 may add a record of the object associated with a matching image to the library 107. The record of the object may include one or more of the characteristics associated with the matching image. For example, where the object is a DVD, the characteristics may include a title, direction, running time, region, release date, etc. Some or all of the associated characteristics may be stored in the record of the object. In some implementations, the record may include an indicator of the location of the object. The indicator may be provided by the user or may be the image received from the image generator 102. When the user later queries the library 107 for the record of the object, the user can look at the image stored with the record and deduce the location of the object from the image. In some implementations, where a record of the object associated with a matching image is already in the library 107 (e.g., the user is updating the location of the object in the library), the image comparator 105 may update the indicator of a location in the existing record.

The system 100 may further include a recommendation server 110. The recommendation server 110 may receive one or more records from the library 107 of the object library application 103, or the entire library 107, and make a recommendation of one or more objects based on the received one or more records. For example, the recommendation may be directed to objects that the user associated with the library 107 is likely to enjoy. The recommendation may be displayed to the user at the object library application 103 and may optionally include a link to the publisher 109 or a merchant where the user may purchase the recommended one or more objects.

The recommendation server 110 may include a recommendation engine 112. The recommendation engine 112 may receive the one or more records and compare them with the records in one or more external libraries 111. The external libraries 111 may include copies of libraries 107 received from various users of the object library application 103. For example, an object library application 103 may periodically transmit its library 107 to the recommendation server 110 and the recommendation server 110 may add the received library 107 to the external libraries 111. In some implementations, whether or not a user's library 107 is added to the external libraries 111 may be controlled using privacy settings at the object library application 103.

The recommendation engine 112 may generate one or more object recommendations based on the received one or more records and the external libraries 111 using techniques such as collaborative filtering. For example, the recommendation engine 112 may identify one or more external libraries from the external libraries 111 that contain some or all of the received one or more records from the library 107. The recommendation engine 112 may then recommend objects from the identified libraries that are not included in the one or more records received from the library 107.

The system 100 may further include a social networking system 120. The user associated with the object library application 103 may provide one or more records of the library 107 to an account associated with the user at the social networking system 120. The social networking system 120 may include a variety of social networking systems such as Facebook™, MySpace™, Friendster™, and Orkut™, for example. The user may then display records from their library 107 on a page associated with their account, or connect with other users of the social networking system 120 having similar libraries.

As described above, the object library application 103 may allow a user to add multiple objects to a library, or update the location of multiple objects in a library, by taking an image or video of the objects as they normally reside in the user's collection. For example, a user may take a picture of books on a shelf and the books visible in the picture are recognized and added to the user's library. While the particular implementations described focus on a single user maintaining a collection of objects such as books, CDs, and wine, the object library application 103 may be adapted for use in a number of additional implementation where objects may be tracked in a library.

In one example implementation, the object library application 103 may be used in an office to manage office supplies. An employee may periodically take images of office supplies as they sit in an office supply closet. The images of the office supplies are used by the object library application 103 as described above to identify the office supplies shown in the images (e.g., images of paper reams, boxes of pens, boxes of paper clips, etc.). Records of the identified office supplies are then added to a library of office supplies. Office supplies that are not identified may be flagged, or otherwise indicated to the employee, so that the employee may order the missing office supplies.

In another example implementation, the object library application 103 may be used to inventory and manage food supplies in a kitchen. For example, a user may periodically take images of food objects (e.g., canned and dried goods, packaged foods, etc.). The images of the food objects are used by the object library application 103 as described above to identify the food objects shown in the images. Records of the identified food objects are then added to a library of food objects. The object library application 103 may then alert the user when it is time to buy additional food objects, or may recommend recipes that can be made using the food objects in the library.

FIGS. 2a-2d are illustrations of example user interfaces for use with a system for the creation and maintenance of an object library, such as the object library application 103, for example. While the following example user interfaces are described using an example where the objects are books, it is for illustrative purposes only. A variety of object types may be supported.

Figure 2A:
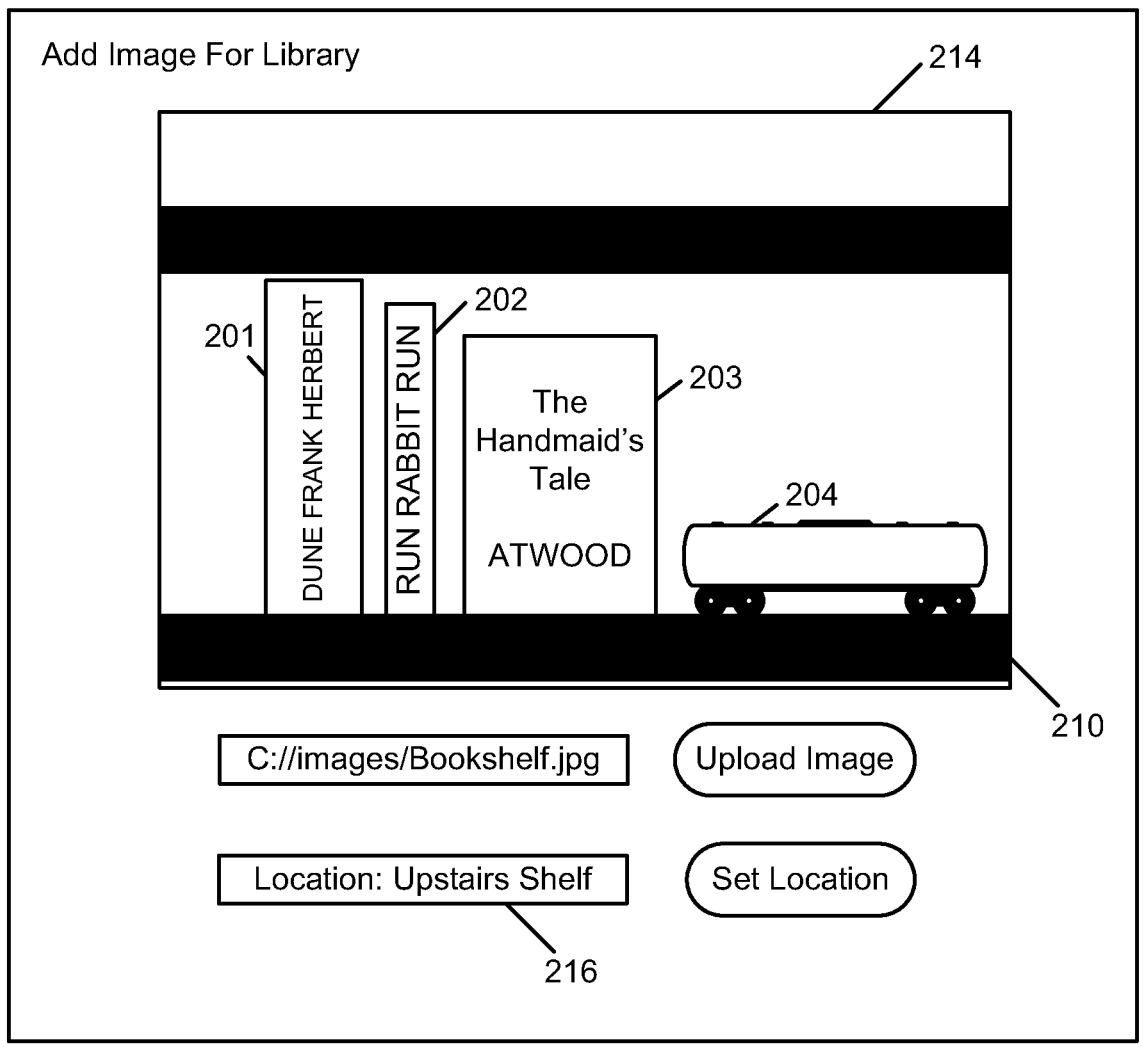

FIG. 2a is an illustration of a window 200 of a user interface for adding one or more books to a library. As shown in the window 200, a user has provided an image 214 of a bookshelf 210. The bookshelf 210 includes four visible objects, books 201, 202, 203, and model train 204. A user may want to add one or more of the three books 201, 202, 203 to the user's library (e.g., library 107), or the user may want to update the location of the three books 201, 202, 203 in the library. Accordingly, the user has taken a digital image of the bookshelf 210 (e.g., using the image generator 102) and has uploaded the image 214 to a library application such as the object library application 103 using the window 200. As shown, the user has also optionally provided "Upstairs Shelf" as the location 216 shown in the picture.

Figure 2B:
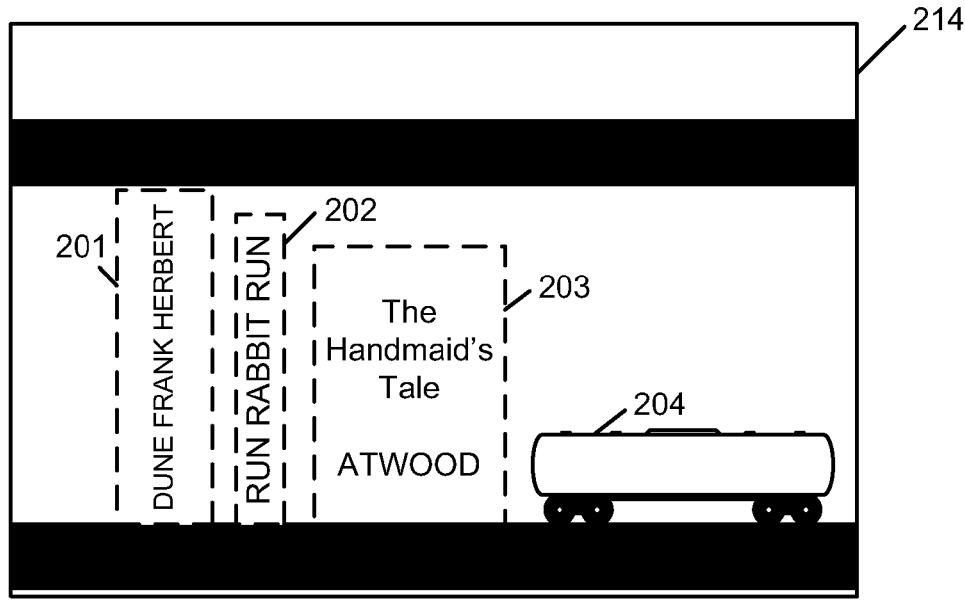

Next, as illustrated in window 220 of FIG. 2b, the user is presented with a marked up version of the image 214 showing the portions of the image 214 that correspond to surfaces of books 201, 202, and 203. The portions may have been located by the object locator 104, for example. The portions of the image corresponding to the boundaries of the books 201, 202, and 203 are shown highlighted with dotted lines. The portion of the image 214 corresponding to the model train 204 is not highlighted because it was not identified as a book. For example, the model train 204 may not have been identified by the object locator 104 because its shape is not similar to one of the shapes typically associated with books.

In the implementation shown, the user may either confirm that the located portions correspond to the books in the image by selecting the "Accept Object(s)" button 223, or the user may add or remove additional books by selecting the "Add or Remove Object(s)" button 225. If the user selects the "Add or Remove Object(s)" button 225, the user may remove an object by selecting and deleting the dotted portion from the image 214. The user may also add additional objects by drawing on or indicating the portions of the image 214 that correspond to the additional objects.

As illustrated in window 230 of FIG. 2c, after selecting the "Accept Object(s)" button 223, the user may be presented with records 232 of the objects indicated by the identified portions of the received image 214. For example, the image comparator 105 may have compared the portions of the image corresponding to the books 201, 202, and 203 to images of book covers and books spines stored in the image storage 108. As shown in the window 230, the portion of the image 214 corresponding to the book 201 matched an image associated with "Dune" by Frank Herbert; the portion of the image corresponding to the book 202 matched an image associated with "Run Rabbit Run" by John Updike; and the portion of the image corresponding to the book 203 matched an image associated with "The Handmaid's Tale" by Margaret Atwood. Also shown are the various characteristics associated with each book including a title, author, publisher, and ISBN number. These characteristics may have been provided by one or more publishers of the books, such as a publisher 109, for example.

The user may add a record to the user's library for each of the identified books by selecting the corresponding "Add to Library" button 235. The records may be added along with the associated characteristics. In addition, an indicator 237 of the location may also be added to each record 232. In the example shown, the location was provided by the user and is listed as "Upstairs Shelf." In other implementations, the indicator 237 of the location may include the original image of the shelf provided by the user.

As illustrated in the window 240 of FIG. 2d, after adding one or more of the books to the user's library, the user is presented with a confirmation 242 that the books were added to the user's library. In addition, the user may be presented with recommendations 245 for other books that the user may enjoy. The recommendations 245 may have been generated by the recommendation engine 112 of the recommendation server 110 based on the books added to the user's library, or alternatively based on the user's library 107, using collaborative filtering along with the libraries 107 of other users. In addition, the user may be presented with a button 247 labeled "Purchase Book" for each recommendation through which the user may purchase each recommended book.

Figure 3:
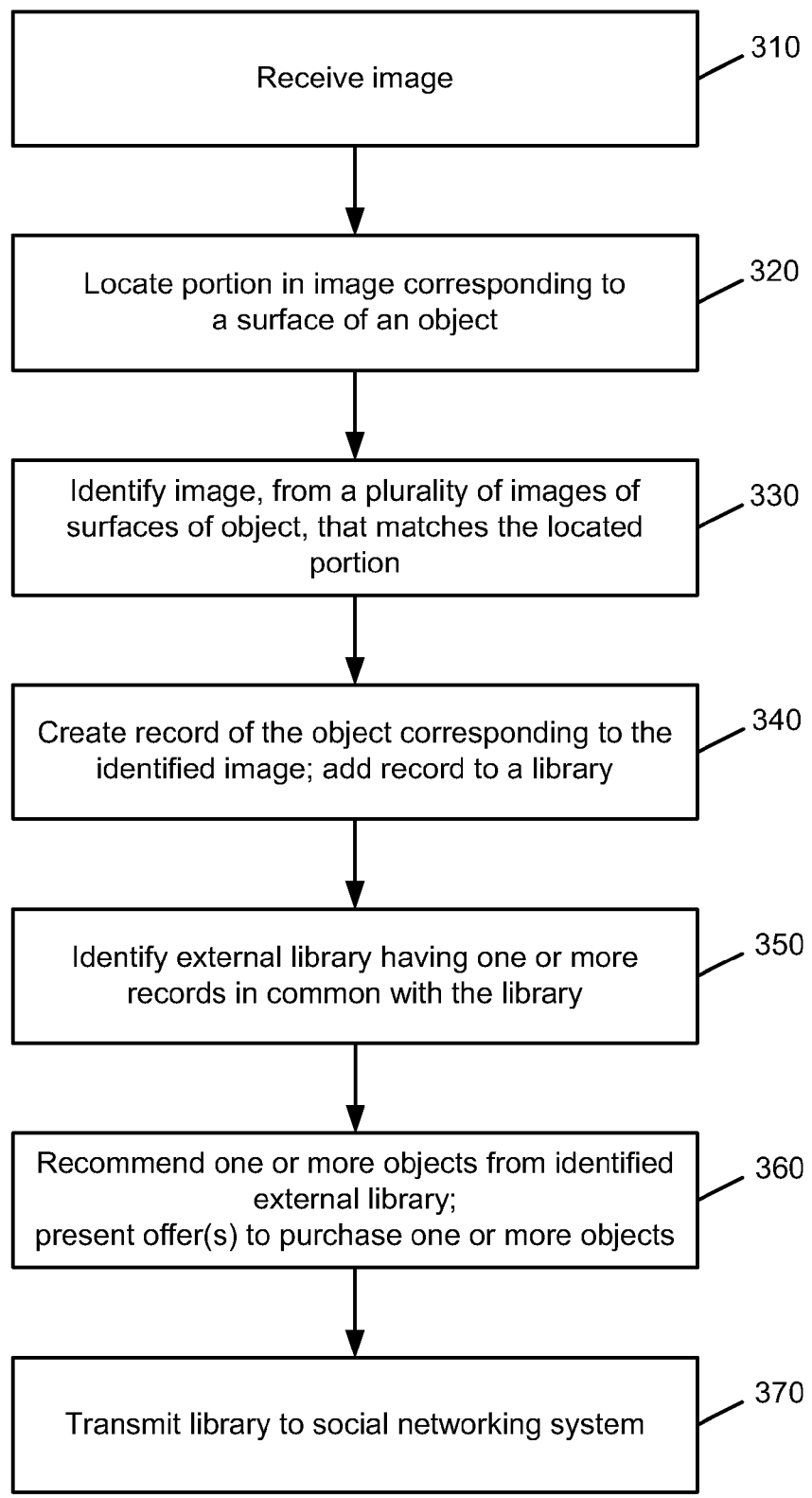
FIG. 3 is an operational flow of an implementation of a method that may be used for the creation and maintenance of an object library.

FIG. 3 is an operational flow of an implementation of a method 300 that may be used for the creation and maintenance of an object library. The method 300 may be implemented using the object library application 103 of the system 100, for example.

An image is received (310). An image may be received by the object library application 103 from the image generator 102. The image generator 102 may be a digital camera or other device capable to taking digital images or video of one or more objects 150. In one implementation, a user may want to add an object such as a book to a library of books. Accordingly, the user may take a digital image of a visible surface of the book, such as the cover or the spine. The book may be located in bookshelf or other location when the image is taken. The user may then present the image of the book to a library application such as the object library application 103.

A portion of the image corresponding to a surface of an object is located (320). The portion of the image may be located by the object locator 104 of the object library application 103. For example, a portion of the image that corresponds to a book may be located in the digital image. The portion of the image may be located by the object locator 104 using any one of variety of known computer vision and/or image processing techniques.

An image from a plurality of images of surfaces of objects that matches the located portion is identified (330). The image may be identified by the image comparator 105 of the object library application 103. The located portion of the image may be compared with one or more of a plurality of images of surfaces of objects. For example, the portion of the image corresponding to the book may be compared with a plurality of images of book covers and spines. A confidence value may be generated for each of the images of surfaces of objects compared to the located portion of the received image. The confidence value may represent the likelihood that a particular image of a book surface matches the portion of an image corresponding to the book. The image of a surface of an object with the highest confidence value may be identified as matching the located portion of the received image.

A record of the object corresponding to the identified image of a surface of an object that matches the located portion is created and added to the library (340). The record may be added to a library such as the library 107 by the image comparator 105 of the object library application 103. For example, a record of the book pictured in a portion of the digital image may be added to the library. The record may include characteristics of the book such as the title, author, and publisher. The record may also include an indicator of a location of the book, such as the received digital image or a portion of the digital image. When the user later wants to retrieve the book, the user may query the library for the book, receive the record of the book including the digital image or the portion of the digital image, and determine the location of the book from the image, for example.

In an implementation, an external library having one or more records in common with the library may be identified (350). The external library 111 may be identified by a recommendation engine 112 using one or more records of the library 107. For example, the external library 111 may be a book library of another user of the object library application 103.

In an implementation, one or more objects from the external library may be recommended (360). The one or more objects may be recommended by the recommendation engine 112 through the object library application 103. In some implementation, the recommended one or more objects may correspond to one or more records of the identified external library 111 that are not in common with the library 107. For example, the recommended objects may be books that correspond to records in the external library 111 that do not have records in the library 107.

In some implementations, the recommended objects may be presented along with one or more offers to purchase the recommended objects. For example, recommended books may be presented with links to the corresponding publishers 109 where the books may be purchased.

In an implementation, the library may be transmitted to a social networking system (370). The library 107 may be transmitted to a social networking system 120 by the object library application 103. For example, the user may have an account at the social networking system 120. The user may share their library 107 on a page of the social networking system 120 corresponding to their account. Other users of the social networking application 120 may then view the user's library 107 at the social networking system 120.

Figure 4:
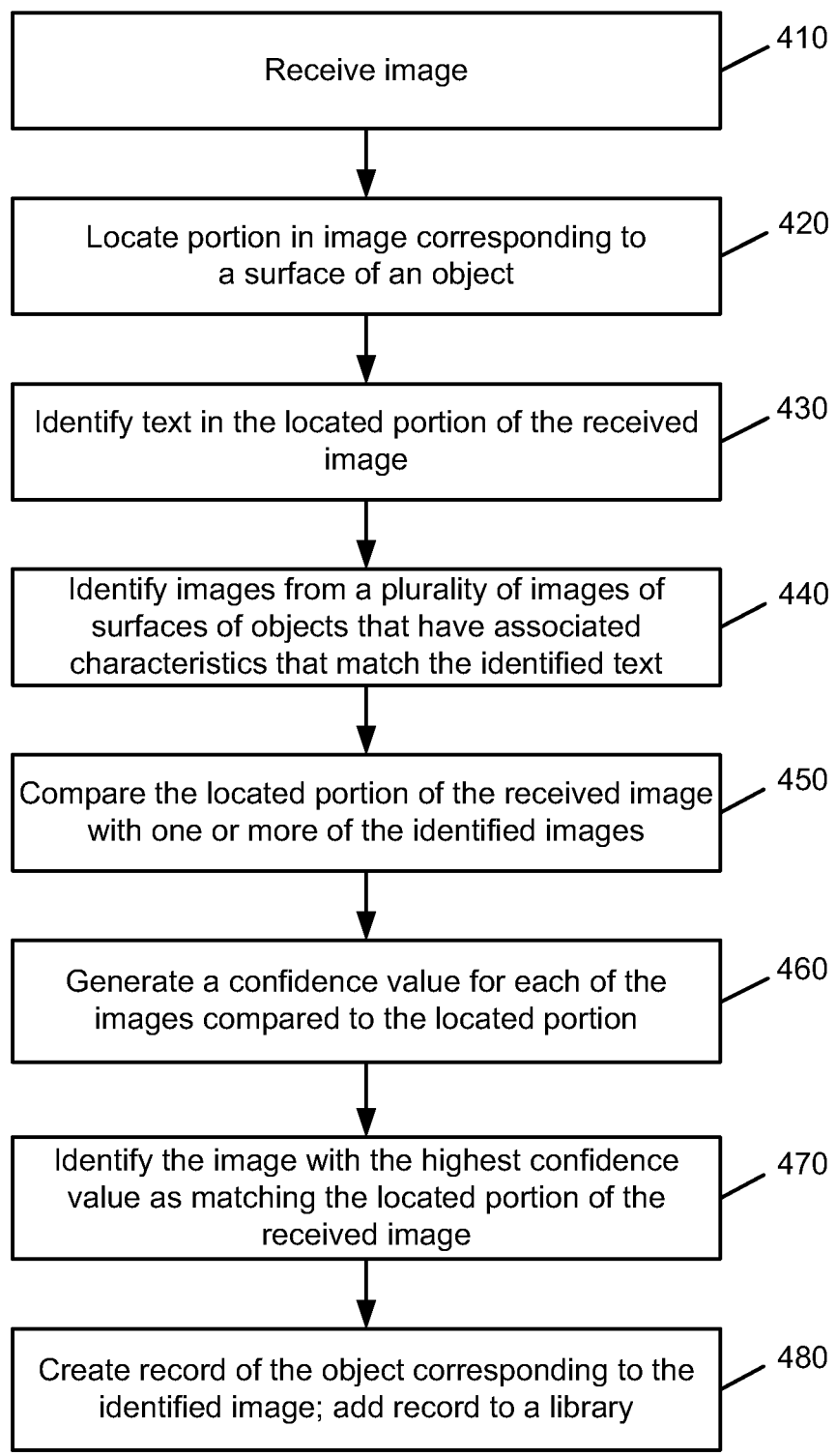
FIG. 4 is an operational flow of another implementation of a method that may be used for the creation and maintenance of an object library.

FIG. 4 is an operational flow of another implementation of a method 400 that may be used for the creation and maintenance of an object library. The method 400 may be implemented using the object library application 103 of the system 100, for example.

An image is received (410). The image may be received by the object library application 103 from the image generator 102. The image may include a plurality of portions corresponding to surfaces of one or more objects 150. For example, a user may want to add several DVDs to a library application or the user may want to update the location of the DVDs in the library application. Accordingly, the user may take a digital image of the desired DVDs as they normally reside at a particular shelf or location, and upload or transmit the image to the library application.

A portion of the image corresponding to a surface of an object of the plurality of surfaces of objects is located (420). The portion of the image may be located by the object locator 104 of the object library application 103. For example, a portion of the image that corresponds to one of the DVDs on the shelf may be identified in the image. The portion of the image corresponding to a DVD may be located by the object locator 104 using any one of variety of known computer vision techniques. For example, the portion may be located by determining the boundaries of the objects in the image and locating an object having boundaries that match or are approximate to known boundaries of DVDs and their storage cases.

Text may be identified in the located portion of the received image (430). The text may be identified by the text extractor 106 of the object library application 103. The text may correspond to characteristics of the object shown in the located portion such as the title of the DVD, for example. Any system, method, or technique for identifying text in an image may be used, such as OCR (optical character recognition).

Images from a plurality of images of surfaces of objects that have characteristics that match the identified text are identified (440). The images may be identified by the image comparator 105 of the object library application 103. As described previously, the images may have been provided by a publisher 109. The images may include characteristics such as a title, author, director, etc. The matching images from the plurality of images of objects may be identified by comparing the identified text with the characteristics of each image, and identifying an image having a characteristic that matches the identified text.

In an implementation, the located portion of the received image may be compared with one or more of the identified images (450). The located portion may be compared with one or more of the identified images by the image comparator 105 of the object library application 103.

In an implementation, a confidence value may be generated for each of the images of surfaces of objects compared to the located portion of the received image (460). The confidence values may be generated by the image comparator 105 of the object library application 103. For example, the confidence value may represent the likelihood that a particular image of a DVD surface matches the portion of an image corresponding to a DVD.

In an implementation, the image having the highest confidence value may be identified as matching the located portion (470). The image may be identified by the image comparator 105 of the object library application 103. In some implementations, where the highest confidence value for an image of an object is less than a threshold confidence value, a user may be prompted to confirm that the image of a surface of an object is a match of the located portion.

A record of the object corresponding to the identified image of a surface of an object that matches the located portion may be created and added to the library (480). The record may be created and added to a library such as the library 107 by the image comparator 105 of the object library application 103. For example, a record of a located DVD in the received image may be added to the library 107. The record may include characteristics of the DVDs such as the title, director, studio, etc.

Figure 5:
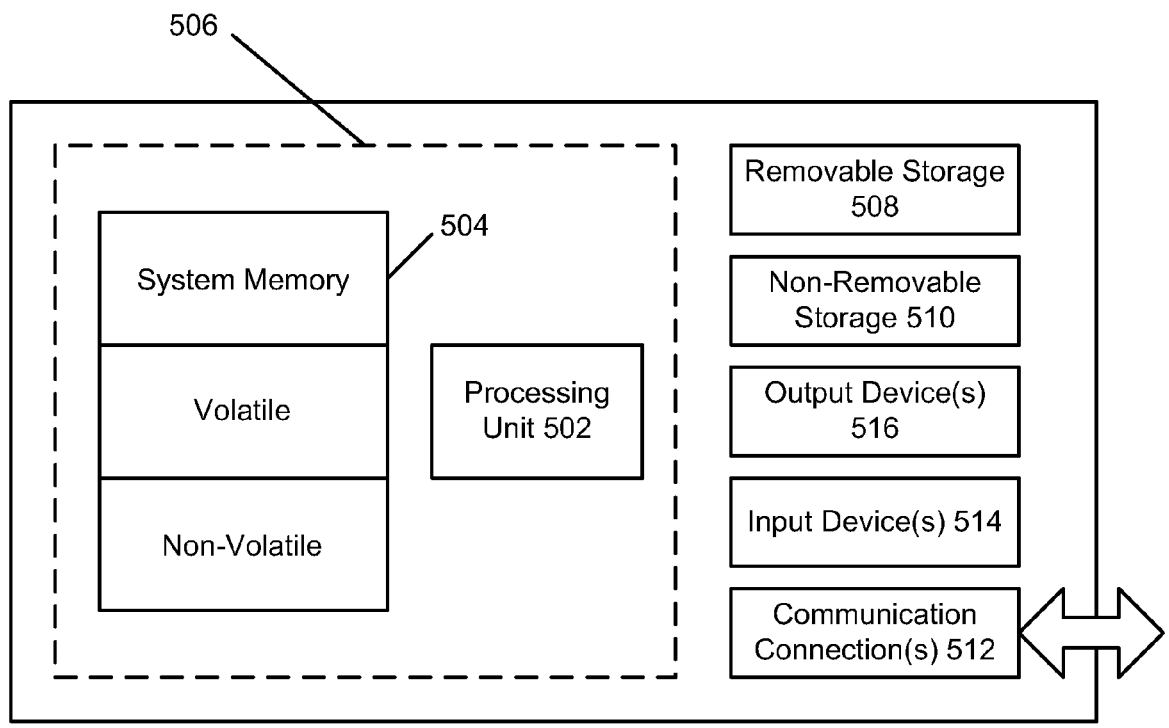
FIG. 5 is a block diagram of an example computing environment in which example embodiments and aspects may be implemented.

FIG. 5 shows an illustration of an exemplary computing environment in which example implementations and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, PCs, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing aspects described herein includes a computing device, such as computing device 500. In its most basic configuration, computing device 500 typically includes at least one processing unit 502 and memory 504. Depending on the exact configuration and type of computing device, memory 504 may be volatile (such as random access memory (RAM)), non-volatile (such as read-only memory (ROM), flash memory, etc.), or some combination of the two. This most basic configuration is illustrated in FIG. 5 by dashed line 506.

Computing device 500 may have additional features/functionality. For example, computing device 500 may include additional storage (removable and/or non-removable) including, but not limited to, magnetic or optical disks or tape. Such additional storage is illustrated in FIG. 5 by removable storage 508 and non-removable storage 510.

Computing device 500 typically includes a variety of computer readable media. Computer readable media can be any available media that can be accessed by device 500 and include both volatile and non-volatile media, and removable and non-removable media.

Computer storage media include volatile and non-volatile, and removable and non-removable media implemented in any method or technology for storage of information such as computer readable instructions, data structures, program modules or other data. Memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, DVD) or other optical storage, magnetic cassettes, magnetic tape, magnetic disk storage or other magnetic storage devices, or any other medium which can be used to store the desired information and which can be accessed by computing device 500. Any such computer storage media may be part of computing device 500.

Computing device 500 may contain communications connection(s) 512 that allow the device to communicate with other devices. Computing device 500 may also have input device(s) 514 such as a keyboard, mouse, pen, voice input device, touch input device, etc. Output device(s) 516 such as a display, speakers, printer, etc. may also be included. All these devices are well known in the art and need not be discussed at length here.

Computing device 500 may be one of a plurality of computing devices 500 inter-connected by a network. As may be appreciated, the network may be any appropriate network, each computing device 500 may be connected thereto by way of communication connection(s) 512 in any appropriate manner, and each computing device 500 may communicate with one or more of the other computing devices 500 in the network in any appropriate manner. For example, the network may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the processes and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an API, reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include PCs, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for creating an object library, comprising:
receiving an image, wherein a portion of the image corresponds to a surface of an object;
locating the portion of the received image that corresponds to a surface of an object and an object boundary;
identifying an image of a surface of an object from a plurality of images of surfaces of a plurality of objects that matches the located portion of the received image; and
adding a record of the object corresponding to the identified image of the surface of the object that matches the located portion of the received image to a library.

2. The method of claim 1, wherein the record of the object comprises the received image.

3. The method of claim 1, further comprising receiving an indicator of a location of the object and adding the indicator of the location of the object to the record.

4. The method of claim 1, wherein the plurality of objects are books, and the surfaces of the plurality of objects comprise spines of the books or covers of the books.

5. The method of claim 1, further comprising transmitting the library to a social networking system.

6. A method for creating an object library, comprising:
receiving an image, wherein the image includes a plurality of portions that correspond to surfaces of a plurality of objects;
locating a portion of the received image that corresponds to one of the surface of one of the plurality of objects by determining an object boundary in the received image and locating at least one portion of the received image that is likely to correspond to at least one surface of the object based on a size and a shape of the object boundary;
comparing the located portion of the received image with at least one of a plurality of images of surfaces of objects;
generating a confidence value for each of the plurality of images of surfaces of objects compared to the located portion;
identifying an image of the plurality of images of surfaces of objects with the highest confidence value as matching the located portion of the received image; and
adding a record of an object corresponding to the identified image that matches the located portion to a library.

7. The method of claim 6, wherein the image is received from a digital camera.

8. The method of claim 6, wherein receiving the image comprises receiving a video and extracting the received image from the video.

9. The method of claim 6, further comprising receiving an indicator of a location of the object and adding the indicator of a location of the object to the record.

10. The method of claim 6, further comprising:
identifying an external library that has at least one record in common with the library; and
recommending at least one object from the external library.

11. The method of claim 10, further comprising presenting an offer to purchase one of the recommended at least one objects.

12. The method of claim 6, wherein the objects are books.

13. The method of claim 6, further comprising providing the record to a social networking system.

14. The method of claim 6, wherein the plurality of images of surfaces of objects have characteristics, and further comprising:
identifying text in the located portion of the received image;
identifying images from the plurality of images of surfaces of objects that have characteristics that match the identified text; and
comparing the located portion of the received image only with at least one of the identified plurality of images of surfaces of objects that have characteristics that match the identified text.

15. A system comprising:
a processor;
an object locator adapted to locate a portion of a received image that corresponds to a surface of an object, wherein the surface of the object is distinct from an object boundary of the object in the received image;
an image comparator adapted to identify an image of a surface of an object from a plurality of images of surfaces of a plurality of objects that matches the located portion of the received image; and
a database adapted to store a record of the object corresponding to the identified image of the surface of the object that matches the located portion.

16. The system of claim 15, wherein the record of the object comprises the received image.

17. The system of claim 15, wherein the database is further adapted to add an indicator of a location of the object to the record.

18. The system of claim 15, wherein the plurality of objects are books, and the surfaces of the plurality of objects are spines of the books or covers of the books.

19. The system of claim 15, wherein the image comparator is further adapted to:
compare the located portion of the received image with one or more of the plurality of images of surfaces of objects;
generate a confidence value for each of the images of surfaces of objects compared to the located portion; and
identify an image of the plurality of images of surfaces of objects with the highest confidence value as matching the located portion of the received image.

20. The system of claim 15, further comprising a recommendation engine adapted to recommend at least one object based on records of objects in the database.

* * * * *